United States Patent
Sherman

(10) Patent No.: US 6,251,289 B1
(45) Date of Patent: Jun. 26, 2001

(54) TREATMENT OF CONTAMINATED LIQUIDS WITH OXIDIZING GASES AND LIQUIDS

(75) Inventor: Jeffrey H. Sherman, Dallas, TX (US)

(73) Assignee: GRT, Inc., Dallas, TX (US)

(*) Notice: Subject to any disclaimer, the term of this patent is extended or adjusted under 35 U.S.C. 154(b) by 0 days.

(21) Appl. No.: 09/418,445

(22) Filed: Oct. 15, 1999

Related U.S. Application Data

(63) Continuation-in-part of application No. 09/325,503, filed on Jun. 3, 1999, now Pat. No. 6,103,130.

(51) Int. Cl.[7] .................................................. C02F 1/72
(52) U.S. Cl. ................ 210/758; 210/754; 210/759; 210/760; 210/763; 210/192; 210/908
(58) Field of Search ................................. 210/754, 758, 210/759, 760, 763, 192, 908

(56) References Cited

U.S. PATENT DOCUMENTS

| | | | |
|---|---|---|---|
| 5,122,312 | 6/1992 | Tomalesky | 261/122 |
| 5,151,187 | 9/1992 | Behmann | 210/607 |
| 5,156,173 | 10/1992 | Keyser et al. | 134/61 |
| 5,271,810 | 12/1993 | Keyser et al. | 202/185.2 |
| 5,316,682 | 5/1994 | Keyser et al. | 210/649 |
| 5,510,544 | 4/1996 | Keyser | 570/125 |
| 5,658,458 | 8/1997 | Keyser et al. | 210/195.1 |

*Primary Examiner*—Duane Smith
*Assistant Examiner*—Betsey Morrison Hoey
(74) *Attorney, Agent, or Firm*—Michael A. O'Neil

(57) ABSTRACT

In a method of removing organic contaminants from a liquid, an oxidizing gas is formed into sub-micron size bubbles which are dispersed into an initially contaminated liquid, after which the treated liquid is recovered. The oxidizing gas is preferably selected from a group including ozone and chlorine dioxide and is utilized immediately upon its manufacture. An oxidizing liquid may be employed in conjunction with the oxidizing gas.

20 Claims, 8 Drawing Sheets

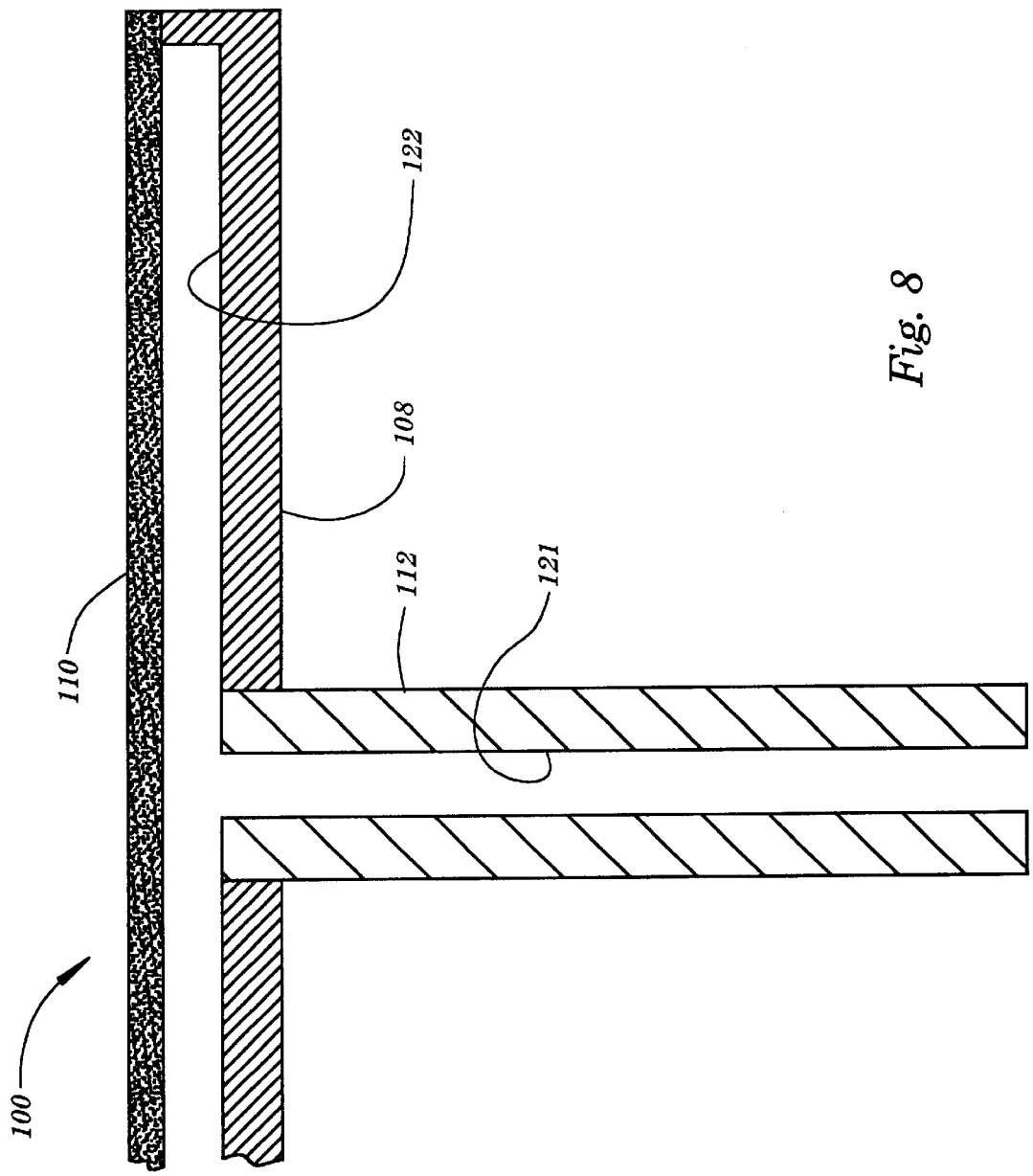

TREATMENT OF CONTAMINATED LIQUIDS WITH OXIDIZING GASES AND LIQUIDS

CROSS-REFERENCE TO RELATED APPLICATION

This application is a continuation-in-part of application Ser. No. 09/325,503 filed Jun. 3, 1999, now U.S. Pat. No. 6,103,130, issued Aug. 15, 2000.

TECHNICAL FIELD

This invention relates generally to the treatment of contaminated liquids with oxidizing gases and oxidizing liquids, and more particularly to the treatment of liquids of the type having organic contaminants contained therein with oxidizing gases such as ozone and chlorine dioxide and with oxidizing liquids such as hydrogen peroxide.

BACKGROUND AND SUMMARY OF THE INVENTION

As is well known, various liquids are contaminated by organic materials. For example, used lubricating oil frequently includes organic materials comprising products of combustion. Waste water is almost always contaminated by organic materials such as human and animal waste, decaying vegetable materials, etc.

As is also well known, organic contaminants can be removed from liquids by exposing the contaminated liquids to oxidizing agents, particularly oxidizing gases. Ozone and chlorine dioxide are among the most potent of the oxidizing gases, and therefore offer tremendous potential with respect to the removal of organic contaminants from used lubricating oil, wastewater, and other liquids. Unfortunately, the inherent instability of ozone and chlorine dioxide has heretofore limited the efficient commercial utilization thereof in the removal of organic contaminants from liquids.

Another problem involved in the removal of organic contaminants from liquids is the time duration of the exposure of an oxidizing agent to the contaminants in the liquid. As is known from Stoke's Law, larger bubbles rise faster in a given liquid. Because it has heretofore not been possible to generate sub-micron size bubbles of oxidizing gases, much larger bubbles, bubbles in the 100–500 micron range, have necessarily been used. Due to the relatively rapid movement of larger bubbles, towers having substantial vertical height have been required in order to increase the time duration of the exposure of the oxidizing gas to the contaminated liquid. Unfortunately, increasing height of the tower increases the pressure that is necessary to overcome head pressure in order to disperse the oxidizing gas in the liquid to be treated.

Organic contaminants can also be removed from liquids by means of oxidizing liquids such as hydrogen peroxide. Oxidizing liquids are typically quite expensive relative to oxidizing gases. For this reason it has heretofore been impractical to utilize oxidizing liquids in wastewater treatment and similar large scale operations.

The present invention comprises a method of and apparatus for utilizing oxidizing gases and oxidizing liquids to remove organic contaminants from liquids which overcomes the foregoing and other problems long since associated with the prior art. In accordance with one aspect of the invention, oxidizing gas is utilized at its source and is formed into sub-micron size bubbles which are immediately dispersed into a flowing liquid to be decontaminated. Due to the sub-micron size of the bubbles, the surface area of the oxidizing gas is greatly increased, thereby greatly increasing the efficiency of the gas in oxidizing organic contaminants from the liquid. This in turn substantially reduces the vertical height necessary to effectively treat the contaminated liquid, thereby substantially reducing the pressure at which the oxidizing gas is used.

In accordance with a first application of the invention, an oxidizing gas is selected from the group including ozone and chlorine dioxide. The oxidizing gas is formed into sub-micron size bubbles by directing it through a sintered stainless steel, sintered glass, sintered ceramic, or porous ceramic tube. Used lubricating oil is caused to flow past the exterior of the sintered/porous tube. The flowing liquid cleaves sub-micron size bubbles of the oxidizing gas from the surface of the tube. The sub-micron size bubbles of oxidizing gas are dispersed into the used lubricating oil, whereupon organic contaminants contained within the used lubricating oil are efficiently oxidized.

In accordance with a second application of the invention, an oxidizing gas is selected from the group including ozone and chlorine dioxide. The oxidizing gas is formed into sub-micron sized bubbles by directing it through a sintered stainless steel, sintered glass, sintered ceramic, or porous ceramic tube. Wastewater is caused to flow past the exterior of the tube. The flowing liquid cleaves sub-micron size bubbles of the oxidizing gas from the surface of the tube. The sub-micron size bubbles of oxidizing gas are dispersed into the wastewater, whereupon organic contaminants contained within the wastewater are efficiently oxidized.

In accordance with a second aspect of the invention, the exterior surface of the sintered stainless steel, sintered glass, sintered ceramic or porous ceramic tube is provided with a coating of a radiation-activated catalyst such as titanium dioxide. During operation, the catalyst is activated by exposure by ultraviolet radiation, sunlight, visible light, or other electromagnetic radiation. Activation of the catalyst causes the formation of hydroxyl radicals in the contaminated liquid which augment the action of an oxidizing gas or an oxidizing liquid in the removal of organic contaminants from the liquid.

BRIEF DESCRIPTION OF THE DRAWINGS

A more complete understanding of the invention may be had by reference to the following Detailed Description when taken in conjunction with the accompanying Drawings, wherein:

FIG. 8 is a further illustration of the embodiment of FIG. 7.

DETAILED DESCRIPTION

Figure 1:
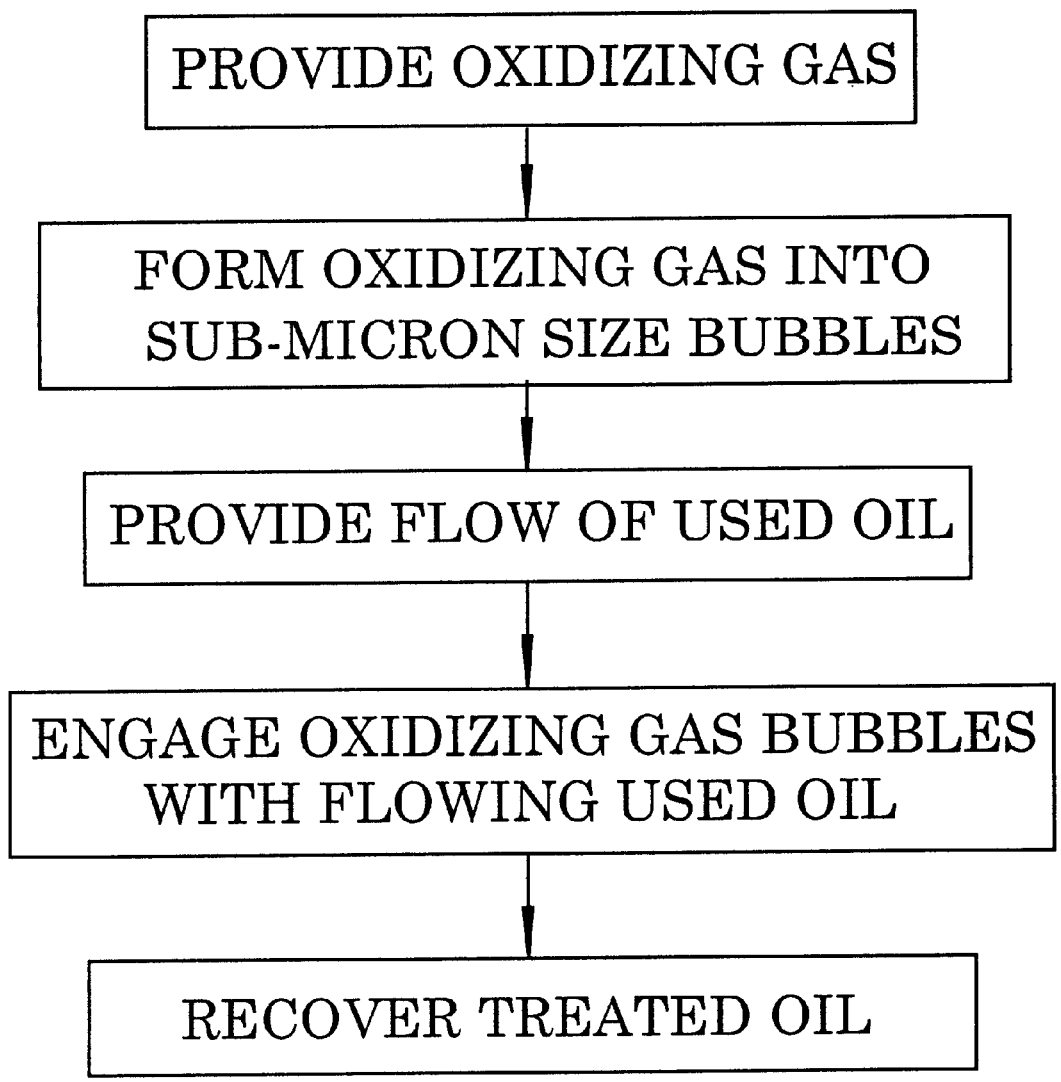
FIG. 1 is a flow chart illustrating a first embodiment of the invention.

Referring now to the Drawings, and particularly to FIG. 1 thereof, there is shown a method for the treatment of contaminated liquids with oxidizing gases comprising a first embodiment of the invention. The first step of the method comprises the manufacture of an oxidizing gas utilizing conventional and well known techniques. The oxidizing gas preferably selected from the group includes ozone and chlorine dioxide, however, other oxidizing gases may be utilized in the practice of the invention, if desired. Immediately upon its manufacture, the selected oxidizing gas is formed into sub-micron size bubbles.

A quantity of used lubricating oil having organic contaminants (a petroleum distillate) contained therein, such as compounds of sulfur, nitrogen, etc., is caused to flow into engagement with the sub-micron size bubbles of oxidizing gas. The oxidizing gas bubbles are dispersed into the used lubricating oil whereupon organic contaminants contained within the oil are immediately oxidized. The sub-micron size of the bubbles of the oxidizing gas greatly increases the surface area of the oxidizing gas/used lubricating oil interface thereby substantially increasing the efficiency of the oxidizing reaction. Upon completion of the oxidation reaction, the treated lubricating oil is recovered for further processing and/or reuse.

Figure 2:
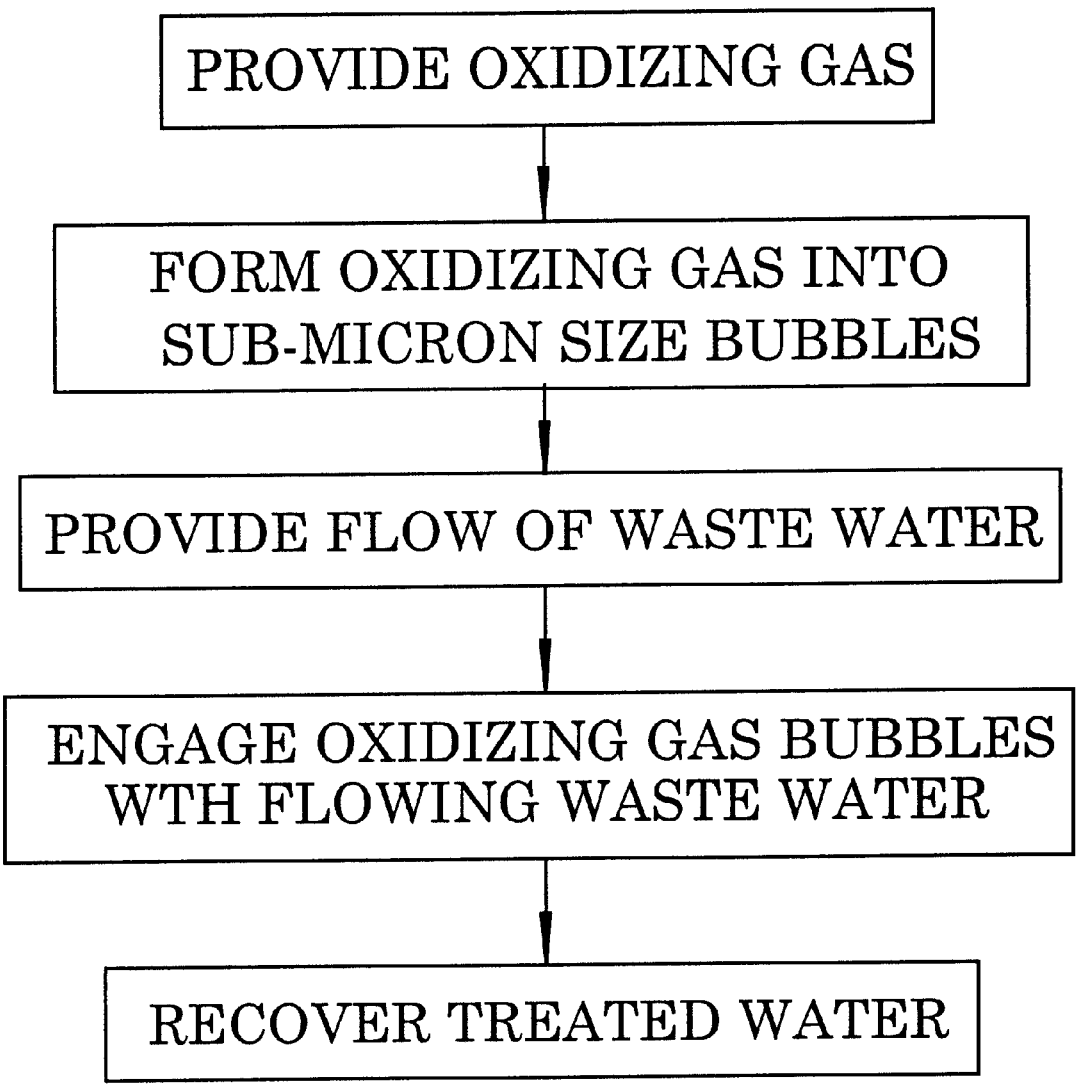
FIG. 2 is a flow chart illustrating a second embodiment of the invention.

Referring to FIG. 2, there is shown a method for the treatment of contaminated liquids with oxidizing gases comprising a second embodiment of the invention. The first step of the method comprises the manufacture of an oxidizing gas utilizing conventional and well known techniques. The oxidizing gas preferably selected from the group includes ozone and chlorine dioxide, however, other oxidizing gases may be utilized in the practice of the invention, if desired. Immediately upon its manufacture, the selected oxidizing gases are formed into sub-micron size bubbles.

A quantity of wastewater having organic contaminants contained therein is caused to flow into engagement with the sub-micron size bubbles of oxidizing gas. The oxidizing gas bubbles are dispersed into the wastewater whereupon organic contaminants contained within the water are immediately oxidized. The sub-micron size of the bubbles of the oxidizing gas greatly increases the surface area of the oxidizing gas/wastewater interface thereby substantially increasing the efficiency of the oxidizing reaction. Upon completion of the oxidation reaction, the treated water is recovered for discharge, further processing, and/or reuse.

Figure 3:
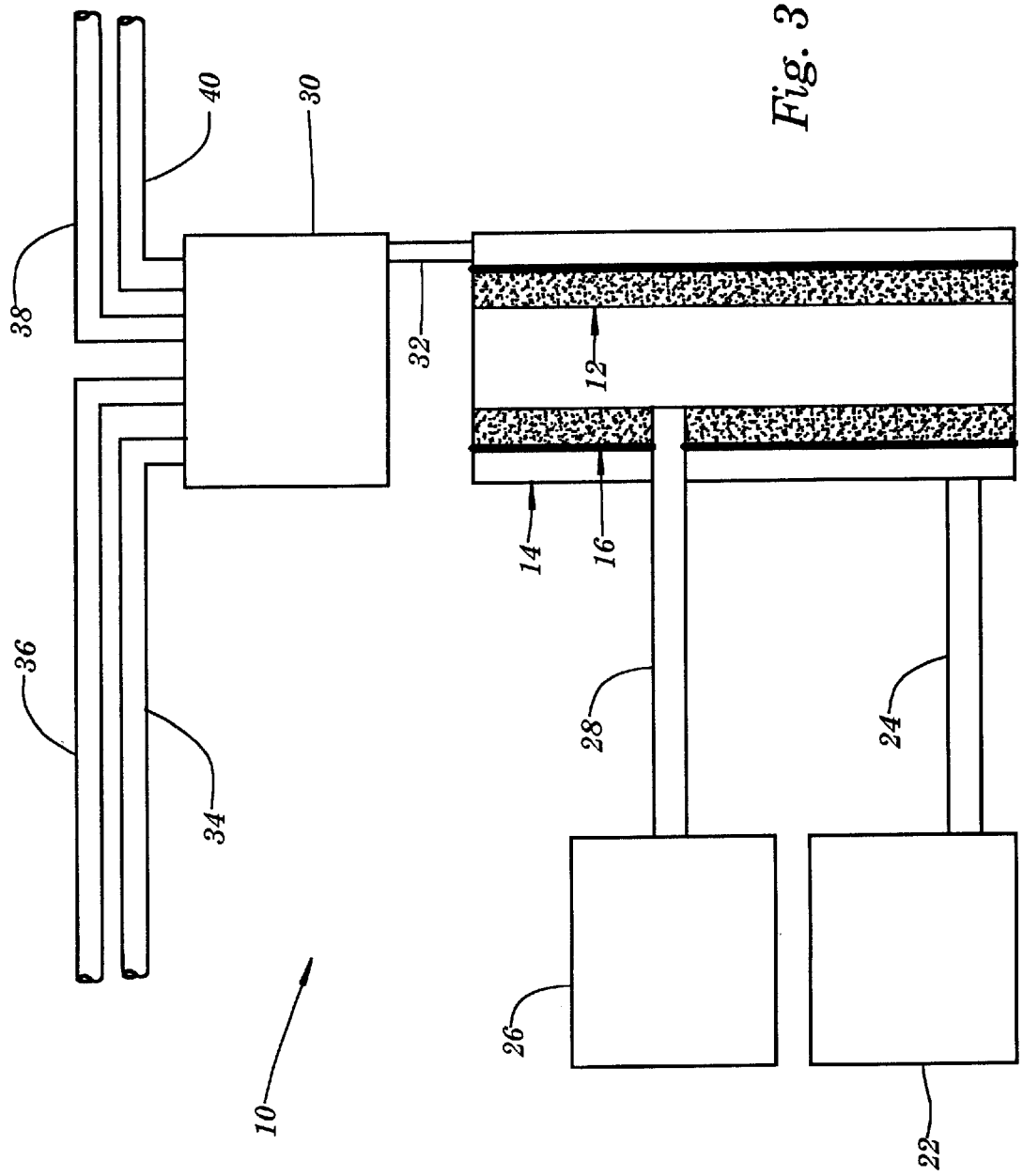
FIG. 3 is a diagrammatic illustration of a first apparatus useful in the practice of the method of the invention.

Referring now to FIG. 3 there is shown an apparatus 10 which may be utilized in the practice in the method of the invention. The apparatus 10 includes a hollow tube 12 formed from sintered stainless steel, sintered glass, sintered ceramic, or porous ceramic. Those skilled in the art will know and understand that other porous materials not subject to attack by oxidizing agents may be used in the practice of the invention. The sintered/porous tube 12 is positioned within a tank 14.

An oxidizing gas is manufactured within a source 16 utilizing conventional and well known techniques. The oxidizing gas is preferably selected from the group including ozone and chlorine dioxide, however, other oxidizing gases may be utilized in the practice of the invention if desired. Immediately upon its manufacture, the oxidizing gas from the source 16 is directed into the interior of the sintered/porous tube 12 through piping 18.

Meanwhile, a liquid having organic contaminants initially contained therein is caused to flow from a source 20 through piping 22 and the tank 14 to an outlet 24. The source 20 may comprise a conventional reservoir, tank, etc., which receives contaminated liquid from one or more sources. Alternatively, the source 20 may comprise the discharge from a facility which produces contaminated liquid in its operation.

The pressure of the oxidizing gas within the interior of the sintered/porous tube 12 is maintained high enough to prevent liquid contained within the tank 14 from flowing inwardly through the tube 12 into the interior thereof. Rather, oxidizing gas flows outwardly from the interior of the tube 12 under substantially less pressure than would be required in prior art apparatus. As the oxidizing gas flows outwardly, it is formed into sub-micron size bubbles which leave the exterior surface of the sintered stainless steel, sintered glass, sintered ceramic, or porous ceramic tube 12 and are dispersed in the contaminated liquid.

As the initially contaminated liquid from the source 20 flows through the tank 14, it passes over the exterior surface of the sintered/porous tube 12 thereby cleaving the sub-micron size bubbles of oxidizing gas from the exterior surface thereof. The sub-micron sized bubbles of oxidizing gas are immediately dispersed throughout the flowing liquid, whereupon organic contaminants contained within the liquid are immediately oxidized. It will be appreciated that because of the sub-micron size of the bubbles comprising the oxidizing gas, the surface area of the interface between the oxidizing gas and the initially contaminated liquid is greatly increased, thereby greatly increasing the efficiency of the oxidizing reaction.

Figure 4:
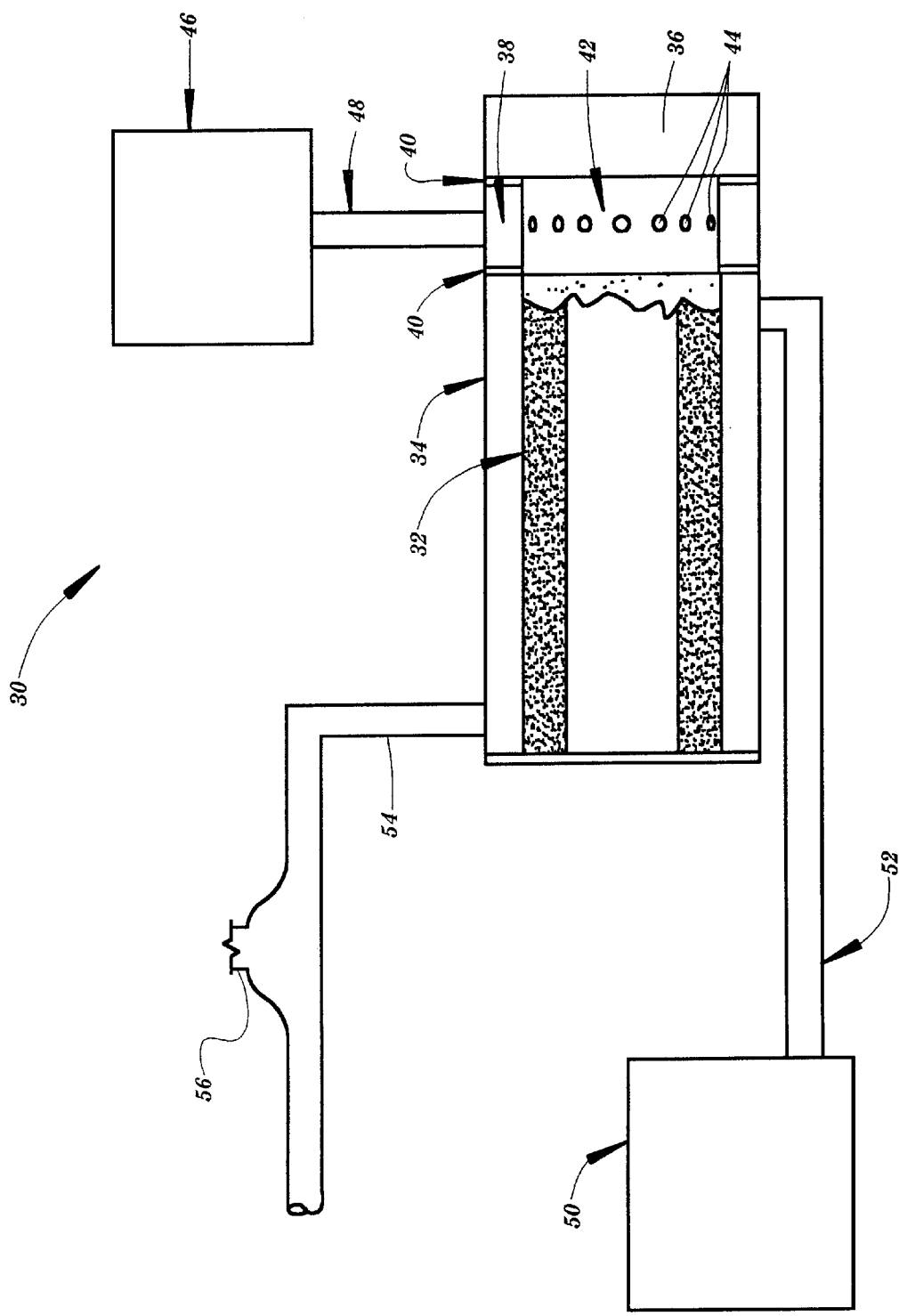
FIG. 4 is a diagrammatic illustration of a second apparatus useful in the practice of the method of the invention.

An alternative apparatus 30 which may be utilized in the practice of the method of the invention is illustrated in FIG. 4. The apparatus 30 includes a sintered stainless steel, sintered glass, sintered ceramic, or porous ceramic tube 32 having a hollow interior which is supported within a tank 34 for rotation about its longitudinal axis. A motor 36 is positioned at one end of the tank 34 and is operatively connected to the tube 32 to effect rotation thereof relative to the tank 34. An annulus 38 is located at one end of the tank 34 and is separated from the tank 34 and from the motor 36 by seals 40. A collar 42 connects the annulus 38 to the interior of the sintered/porous tube 32 through a plurality of passageways 44.

In the operation of the apparatus 30, an oxidizing gas is manufactured within a source 46 utilizing conventional and well known techniques. The oxidizing gas is preferably selected from the group including ozone and chlorine dioxide, however, other oxidizing gases may be utilized in the practice of the invention. Immediately upon its manufacture, the oxidizing are gases directed into the annalus 38 through piping 48. From the annalus 38 the oxidizing gas flows into the interior of the sintered stainless steel, sintered glass, sintered ceramic, or porous ceramic tube through the passageways 44 of the collar 42.

A liquid having organic contaminants contained therein is received from a source 50. The source 50 may comprise a conventional reservoir or tank which receives the contaminated liquid from one or more sources. Alternatively, the source 50 may comprise the discharge of a facility which produces contaminated liquid as a part of its operation.

Liquid having organic contaminants contained therein continuously flows from the source 50 through piping 52 and through the tank 34 to an outlet 54. The pressure of the oxidizing gas within the hollow interior of the tube 32 is maintained sufficiently high that liquid flowing through the tank 34 does not flow inwardly through the tube 32 into the interior thereof. Rather, oxidizing gas from the source 46 flows outwardly from the interior of the sintered or porous tube 32 to the outer surface thereof.

The outwardly flowing oxidizing gas accumulates on the exterior surface of the sintered tube 32 in the form of sub-micron size bubbles. The sub-micron size bubbles of oxidizing gas are immediately cleaved from the exterior surface of the sintered tube by the flow of the initially contaminated liquid over the exterior surface of the sintered/porous tube 32. The sub-micron sized bubbles are dispersed throughout the flowing liquid whereby the organic contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 54. It is contemplated that all of the oxidizing gas will be consumed by the oxidizing reaction. If not, excess oxidizing gas may be recovered from the treated liquid through an outlet 56 and thereafter properly disposed of.

In the operation of the apparatus 30 shown in FIG. 4, the exterior surface of the tube 32 is rotated relative to the liquid flowing through the tank 34 under the action of the motor 36. By this means the relative movement between the exterior surface of the tube 32 and the initially contaminated liquid flowing through the tank 34 is greatly increased. This in turn increases the number of sub-micron sized bubbles of oxidizing gas which is dispersed into the flowing liquid, thereby increasing the efficiency of the oxidation reaction.

Figure 5:
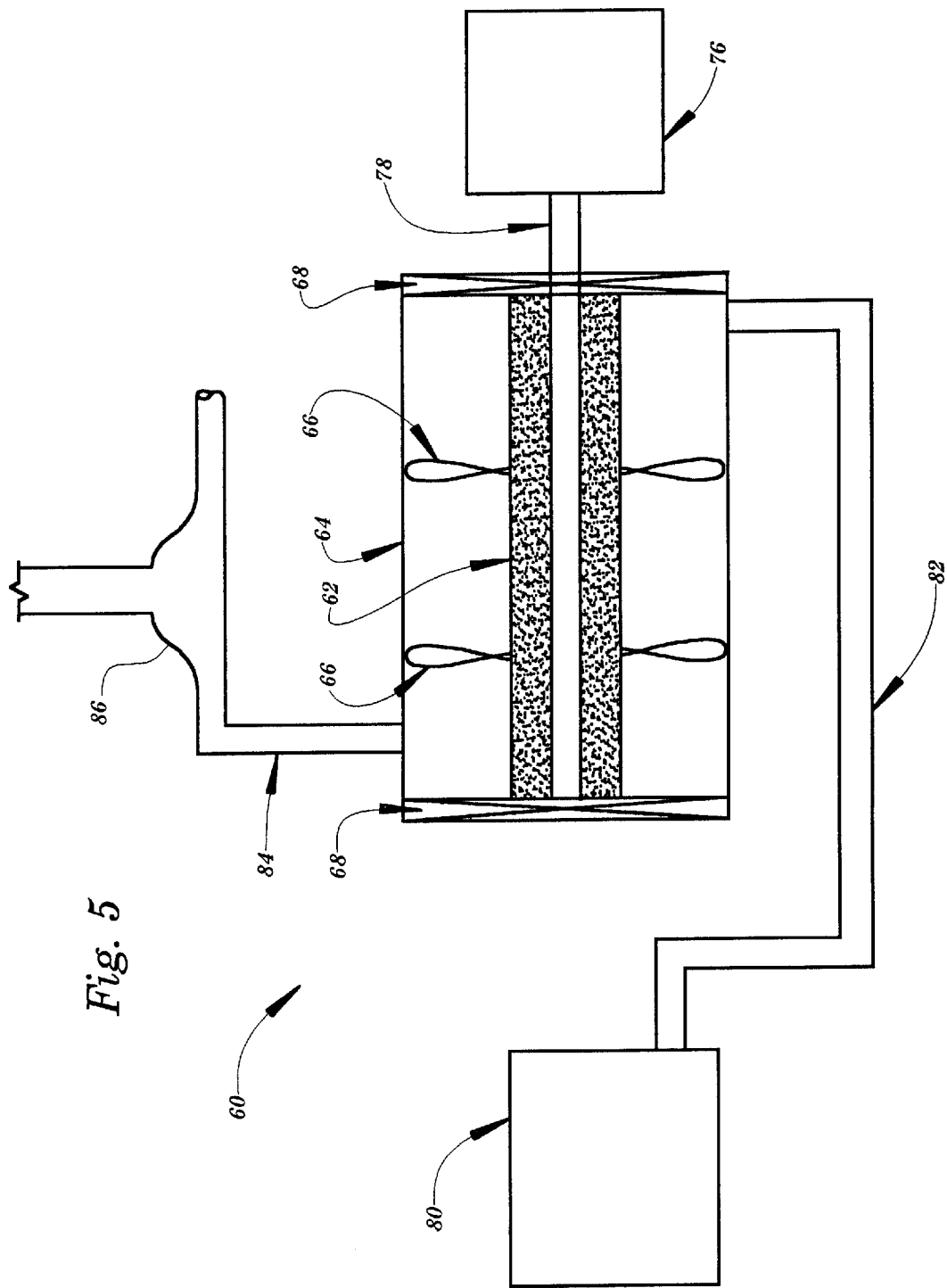
FIG. 5 is a diagrammatic illustration of a third apparatus useful in the practice of the method of the invention.

An alternative apparatus 60, which may be utilized in the practice of the method of the invention, is illustrated in FIG. 5. The apparatus 60 includes a sintered stainless steel, sintered glass, sintered ceramic, or porous ceramic tube 62 having a hollow interior which is supported by bearings 68 within a tank 64 for rotation about its longitudinal axis. One or more turbines 66 are mounted on the sintered/porous tube 62 to effect rotation thereof relative to the tank 64.

In the operation of the apparatus 60, an oxidizing gas is manufactured within a source 76 utilizing conventional and well known techniques. The oxidizing gas is preferably selected from the group including ozone and chlorine dioxide, however, other oxidizing gases may be utilized in the practice of the invention. Immediately upon its manufacture the oxidizing gas is directed through piping 28 into the interior of the sintered or porous tube 62.

A liquid having organic contaminants contained therein is received from a source 80. The source 80 may comprise a conventional reservoir or tank which receives the contaminated liquid from one or more sources. Alternatively, the source 80 may comprise the discharge of a facility which produces contaminated liquid as a part of its operation.

Liquid having organic contaminants contained therein continuously flows from the source 80 through piping 82 and through the tank 64 to an outlet 84. The pressure of the oxidizing gas within the hollow interior of the tube 62 is maintained sufficiently high that liquid flowing through the tank 64 does not flow inwardly through the tube 62 into the interior thereof. Rather-, oxidizing gas from the source 76 flows outwardly from the interior of the tube 62 to the outer surface thereof.

The outwardly flowing oxidizing gas accumulates on the exterior surface of the sintered/porous tube 62 in the form of sub-micron size bubbles. The sub-micron size bubbles of oxidizing gas are immediately cleaved from the exterior surface of the sintered tube by the flow of the initially contaminated liquid over the exterior surface of the tube 62. The sub-micron sized bubbles are dispersed throughout the flowing liquid whereby the organic contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 84. It is contemplated that all of the oxidizing gas will be consumed by the oxidizing reaction. If not, excess oxidizing gas may be recovered from the treated liquid through an outlet 86 and thereafter properly disposed of.

In the operation of the apparatus 60 shown in FIG. 5, the exterior surface of the sintered/porous tube 62 is rotated relative to the liquid flowing through the tank 64 under the action of the turbines 66. By this means, the relative movement between the exterior surface of the sintered tube 62 and the initially contaminated liquid flowing through the tank 64 is greatly increased. This in turn increases the number of sub-micron sized bubbles of oxidizing gas which are dispersed into the flowing liquid, thereby increasing the efficiency of the oxidation reaction.

Those skilled in the art will appreciate the fact that the use of the apparatus 30 shown in FIG. 4 or the apparatus 60 shown in FIG. 5 provides certain advantages with respect to the use of the apparatus shown in FIG. 3 in the practice of the method of the invention. When the apparatus 30 of FIG. 4 is utilized, the relative movement between the exterior surface of the sintered/porous tube 32 and the initially contaminated liquid flowing through the tank 34 depends upon the operation of the motor 36 rather than the flow rate of the liquid. This allows a greater number of sub-micron size bubbles of oxidizing gas to be dispersed into the initially contaminated liquid than would be possible if the cleaving of sub-micron sized bubbles of oxidizing gas from the exterior surface of the tube 32 depended upon the flow of liquid alone. In this manner the efficiency of the oxidation reaction can be further increased.

When the apparatus 60 of FIG. 5 is utilized, the relative movement between the exterior surface of the sintered/porous tube 62 and the initially contaminated liquid flowing through the tank 34 is greatly increased by the operation of the turbines 66. This allows a greater number of sub-micron size bubbles of oxidizing gas to be dispersed into the initially contaminated liquid than would be possible if the cleaving of sub-micron sized bubbles of oxidizing gas from the exterior surface of the tube 62 depended upon the flow of liquid alone. In this manner the efficiency of the oxidation reaction can be further increased.

Figure 6:
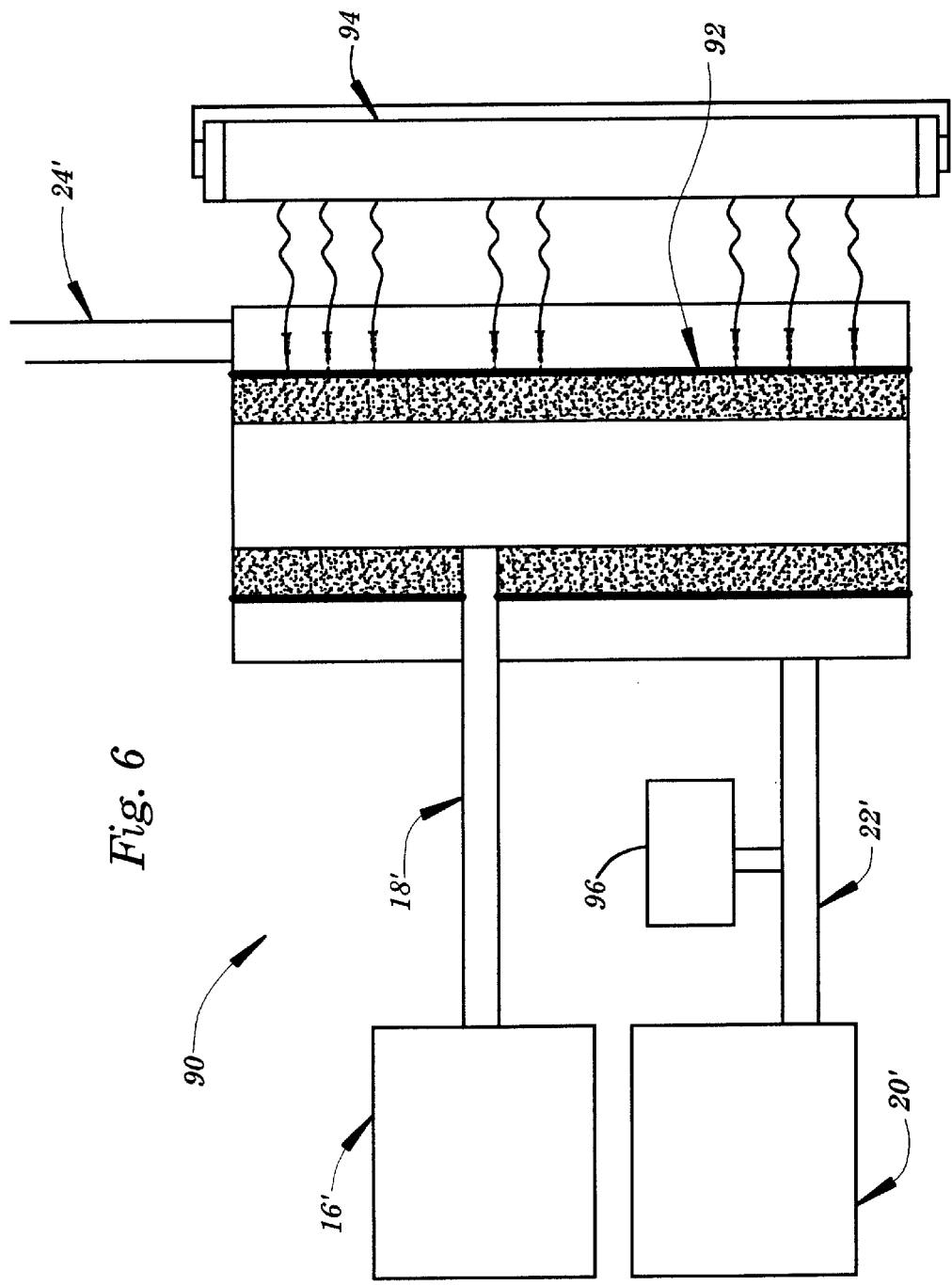
FIG. 6 is a diagrammatic illustration of a third embodiment of the invention.

Referring now to FIG. 6, there is shown an apparatus 90 incorporating a third embodiment of the invention. The apparatus 90 includes many component parts which are substantially identical in construction and function to the component parts of the apparatus 10 illustrated in FIG. 3 and described hereinabove in conjunction therewith. Such identical component parts are designated in FIG. 6 with the same reference numerals utilized in the description of the apparatus 10, but are differentiated thereof by means of a prime (') designation.

The apparatus 90 differs from the apparatus 10 in that the sintered tube 12' thereof is provided with a photocatalytic layer 92 on its exterior surface. The photocatalytic layer 92 may be activated by ultraviolet radiation from a source 94. Alternatively, the photocatalytic layer 92 may be activated by sunlight, or by visible light or by other portions of the electromagnetic spectrum.

Activation of the photocatalytic layer 92 results in the formation of hydroxyl radicals in the initially contaminated liquid flowing between the sintered tube 12' and the tank 14'. The hydroxyl radicals thus formed augment the action of an oxidizing gas or an oxidizing liquid in the removal of organic contaminants from the initially contaminated liquid.

Specifically, ozone may be utilized in the operation of the apparatus 90. Ozone is manufactured by passing oxygen, or air containing oxygen, through an electrically generated corona discharge. Although commonly referred to as "ozone", the resulting oxidizing gas actually comprises 20% or less of ozone, with the remainder comprising oxygen or air.

Upon activation of the photocatalytic layer 92 on the exterior of the sintered tube 12', the ozone component of the oxidizing gas generates hydroxyl radicals more efficiently than would otherwise be the case. Additionally, the oxygen component of the oxidizing gas also responds to the activation of the photocatalytic layer 92 to produce hydroxyl radicals. As will be appreciated by those skilled in the art, it is the hydroxyl radicals that actually comprise the oxidizing agent in the operation of the apparatus 90.

The apparatus 90 may also utilize chlorine dioxide as the oxidizing gas. In the operation of the apparatus 90, air or oxygen is mixed into the chlorine dioxide with the resulting mixture directed through the sintered tube 12' and the photocatalytic layer 92 into the initially contaminated liquid in the tank 14'. The chlorine dioxide generates chlorine species as oxidizing agents. Upon activation of the photocatalytic layer 92, hydroxyl radicals are generated from the oxygen component of the oxidizing gas. Both the chlorine species and the hydroxyl radicals serve as oxidizing agents to remove organic contaminants from the liquid.

The apparatus 90 may also be operated utilizing a liquid oxidizing agent such as hydrogen peroxide. In such instances the liquid oxidizing agent is metered into the liquid stream from a source 96. Air, oxygen, or ozone is directed through the sintered tube 12' and the photocatalytic layer 92 into the initially contaminated liquid. Activation of the photocatalytic layer 92 forms hydroxyl radicals from the oxygen component of the gas stream. In this manner the quantity of the liquid oxidizing agent necessary to remove organic components from the initially contaminated liquid is substantially reduced.

It will be appreciated that the structural components of the apparatus 90 are virtually identical to those of the apparatus 10 of FIG. 3 except for the addition of the photocatalytic layer 92 and the source of ultraviolet light radiation 94 (if used). Similar modifications can be made to the apparatus 30 of FIG. 4, that is, a photocatalytic layer can be applied to the exterior surface of the sintered/porous tube 32 for activation by a source of ultraviolet radiation or sunlight. Likewise, the exterior surface of the sintered/porous tube 62 of the apparatus 60 of FIG. 5 may be provided with a photocatalytic layer adapted for activation by the source of ultraviolet radiation or sunlight. As indicated hereinabove, the generation of sub-micron bubbles in the initially contaminated liquid is increased by means of the motor of the apparatus 30 or the turbines of the apparatus 60 as well as the fact that the sub-micron size of the bubbles causes them to move more slowly through the contaminant liquid, thereby increasing reaction efficiency.

Figure 7:
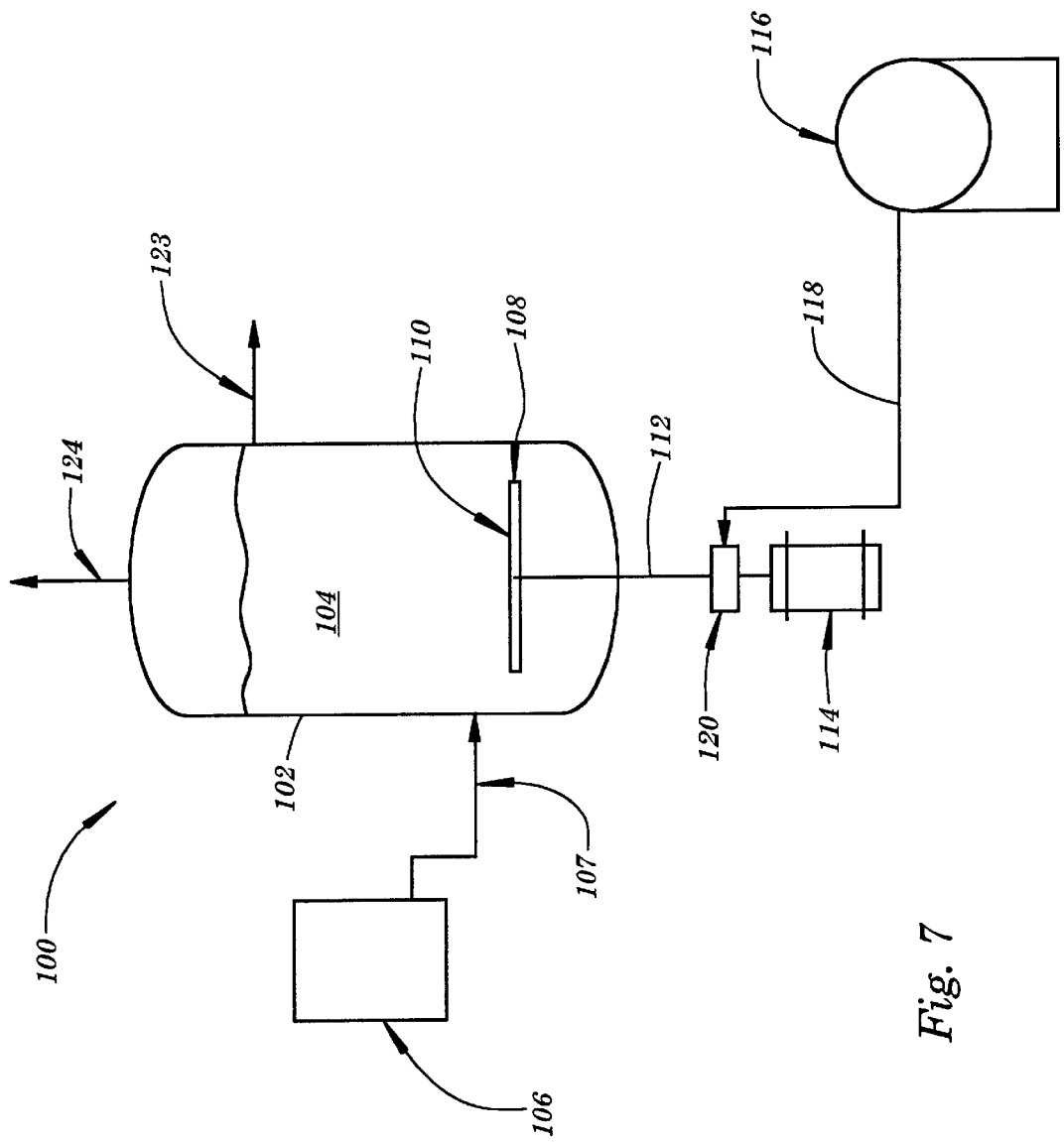
FIG. 7 is a diagrammatic illustration of a fourth embodiment of the invention.

Referring now to FIGS. 7 and 8, there is shown a method of and apparatus for treating contaminated liquid 100 comprising a fourth embodiment of the invention. In accordance with a fourth embodiment of the invention, there is provided a tank 102 having a quantity of contaminated water or other contaminated liquid 104 contained therein. Water or other liquid is supplied to the tank 102 from a source 106 through piping 107.

A hollow disk 108 is mounted in the lower portion of the tank 102. As is best shown in FIG. 8, the disk 108 includes a gas permeable partition 110 supported on a tube 112 for rotation within the tank 102 under the operation under the motor 114. The partition 110 may comprise sintered stainless steel, sintered glass, sintered ceramic, or porous ceramic materials depending upon the requirements of particular applications of the invention. Oxidizing gas received from a supply 116 is directed through piping 118 and a suitable commutator 120 into the tube 112 and through the tube 112 into the interior of the hollow disk 108. The tube 112 has a hollow interior 121 and the disk 108 has a hollow interior 122 connected in fluid communication therewith.

The disk 108 is supplied with oxidizing gas at a pressure just high enough to overcome the head pressure of the water or other liquid 104. The disk 108 is rotated by the motor 114 at an appropriate speed in contact with the water or other liquid 104 such that a shearing phenomenon occurs at the surface of the gas permeable partition 110 thus producing bubbles of extremely small, i.e., sub-micron, size. The extreme small size of the bubbles thus produced results in a surface area to volume ratio of small bubbles which significantly improves the efficiency of the reaction, in particular because the required vertical height of the tank 102 and therefore the pressure of the gas is substantially reduced due to the slower movement of the small bubbles in the liquid. Liquid is recovered from the tank 102 through outlet 123 and any residual gas is recovered from the tank 102 through outlet 124.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method of removing organic contaminants from liquids comprising the steps of:
   providing an oxidizing gas at least a portion of which is oxygen;
   forming the oxidizing gas into sub-micron size bubbles;
   providing a photocatalyst;
   providing a flow of initially contaminated liquid;
   dispersing the sub-micron size bubbles of oxidizing gas into the flowing initially contaminated liquid while simultaneously activating the photocatalyst;
   recovering the treated liquid.

2. The method of claim 1 wherein the oxidizing gas is selected from the group including ozone, chlorine dioxide, oxygen, and air.

3. The method of claim 2 wherein at least part of the oxidizing gas is formed into sub-micron size bubbles and dispersed into the flowing initially contaminated liquid immediately upon its manufacture.

4. The method according to claim 1 wherein:
   the oxidizing gas is directed through sintered material to an exterior surface; and
   the flowing initially contaminated liquid is directed across the exterior surface thereby cleaving sub-micron sized bubbles of oxidizing gas from the exterior surface.

5. The method according to claim 4 wherein the photocatalyst is the exterior surface of the sintered material.

6. The method according to claim 4 including the additional step of moving the exterior surface relative to the flowing liquid.

7. A method of removing organic contaminants from a petroleum distillate comprising the steps of:

provided an oxidizing gas, at least a portion of which is oxygen;

forming the oxidizing gas into sub-micron size bubbles;

providing a photocatalyst;

providing a flow of initially contaminated petroleum distillates;

dispersing the sub-micron sized bubbles of oxidizing gas into the flowing initially contaminated petroleum distillates while simultaneously activating the photocatalyst; and recovering the treated petroleum distillates.

8. A system, comprising:

(a) a communication network capable of providing a first-type channel having a relatively low bandwidth and at least one second-type channel having a relatively high bandwidth over a communication line of the network;

(b) a node of the network having an access ID server capable of generating in response to a request an access ID, wherein an access ID is required to be provided to a switching system of central office facility of the network in order to establish a circuit over the second-type channel; and (c) a calling node of the network that establishes a virtual that does not require an access ID with the access ID server using the first-type channel to request the access ID from the access ID server, wherein the access ID will enable a circuit to be established between the calling node and an end point of the network using the at least one second-type channel, wherein the calling node receives the access ID from the access ID server over the virtual circuit and establishes the circuit over at least one second-type channel by providing the access ID to the switching system.

9. The method of claim 8 wherein at least part of the oxidizing gas is formed into sub-micron size bubbles and dispersed into the flowing initially contaminated petroleum distillate immediately upon its manufacture.

10. The method according to claim 7 wherein:

the oxidizing gas is directed through sintered material to an exterior surface; and the flowing initially contaminated petroleum distillate is directed across the exterior surface thereby cleaving sub-micron sized bubbles of oxidizing gas from the exterior surface.

11. The method according to claim 10 wherein the photocatalyst is the exterior surface of the sintered material.

12. The method according to claim 10 including the additional step of moving the exterior surface relative to the flowing petroleum distillate.

13. A method of removing organic contaminants from wastewater comprising the steps of:

providing an oxidizing gas;

forming the oxidizing gas into sub-micron size bubbles;

providing a photocatalyst;

providing a flow of initially contaminated wastewater;

dispersing the sub-micron sized bubbles of oxidizing gas into the flowing initially contaminated wastewater while simultaneously activating the photocatalyst; and recovering the treated water.

14. The method of claim 13 wherein the oxidizing gas is selected from the group including ozone, chlorine dioxide, oxygen, and air.

15. An apparatus, comprising:

(a) a means for coupling to a communication network capable of providing a first-type channel having a relatively low bandwidth and at least one second-type channel having a relatively high bandwidth over a communication line of the network, wherein an access ID is required to be provided by a calling node of the network to a switching means of the network in order to establish a circuit over a second-type channel;

(b) means for receiving a request for an access ID from the calling node via a virtual circuit that does not require an access ID established by the calling node using the first-type channel, wherein the access ID will enable a circuit to be established between the calling node and an end point of the network using the at least one second-type channel;

(c) means for generating the access ID in response to the request (d) means for transmitting the access ID to the calling node via the virtual circuit; and (e) the switching means for receiving the access ID from the calling node and for establishing the circuit between the calling node and the end point using the access ID.

16. The method according to claim 13 wherein:

the oxidizing gas is directed through sintered material to an exterior surface; and the flowing initially contaminated wastewater is directed across the exterior surface thereby cleaving sub-micron sized bubbles of oxidizing gas from the exterior surface.

17. The method according to claim 16 wherein the photocatalyst is the exterior surface of the sintered material.

18. The method according to claim 16 including the additional step of moving the exterior surface relative to the flowing liquid.

19. The method according to claim 13 including the additional step of dispersing an oxidizing liquid into the wastewater.

20. The method according to claim 19 wherein the oxidizing liquid includes hydrogen peroxide.

\* \* \* \* \*

UNITED STATES PATENT AND TRADEMARK OFFICE
CERTIFICATE OF CORRECTION

PATENT NO. : 6,251,289 B1
DATED : June 26, 2001
INVENTOR(S) : Jeffrey H. Sherman It is certified that error appears in the above-identified patent and that said Letters Patent is hereby corrected as shown below:

Column 4,
Line 45, replace "the oxidizing are gases directed" with -- the oxidizing gases are directed --.

Column 5,
Line 40, replace "through piping 28" with -- through piping 78 --.
Line 55, replace "Rather-," with -- Rather, --

Column 9,
Lines 15-38, replace Claim 8 with the following claim:
-- The method of Claim 7 wherein the oxidizing gas is selected from the group including ozone, chlorine dioxide, oxygen and air. --

Column 10,
Lines 14-37, replace Claim 15 with the following claim:
-- The method of Claim 14 wherein at least part of the oxidizing gas is formed into sub-micron size bubbles and dispersed into the flowing initially contaminated wastewater immediately upon its manufacture. --

Signed and Sealed this

Sixth Day of August, 2002

*Attest:*

JAMES E. ROGAN
*Director of the United States Patent and Trademark Office*

*Attesting Officer*